Nov. 22, 1960 G. E. JODELL 2,960,720
APPARATUS FOR FORMING FOAMED PLASTIC OBJECTS
Original Filed Sept. 13, 1956 2 Sheets-Sheet 1
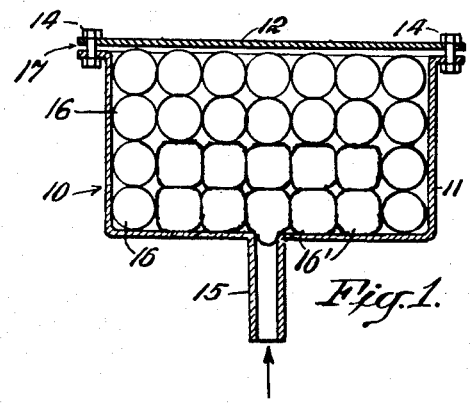
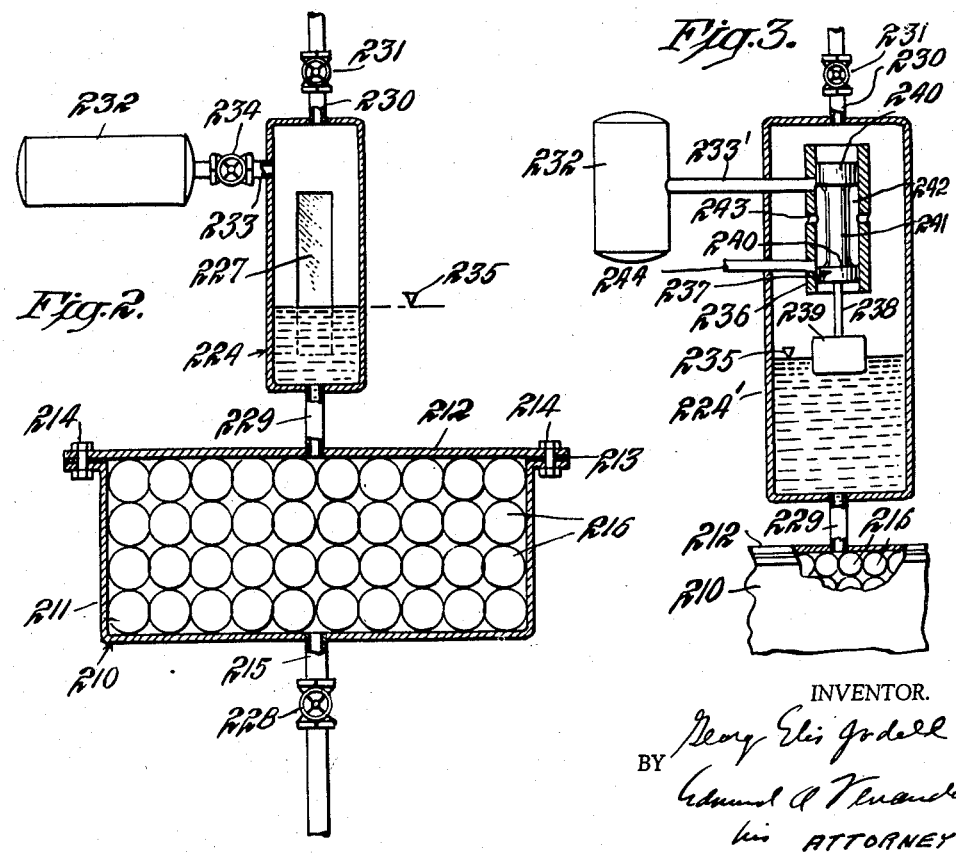
INVENTOR.
BY Georg Elis Jodell
Edmund A. Tenander
his ATTORNEY

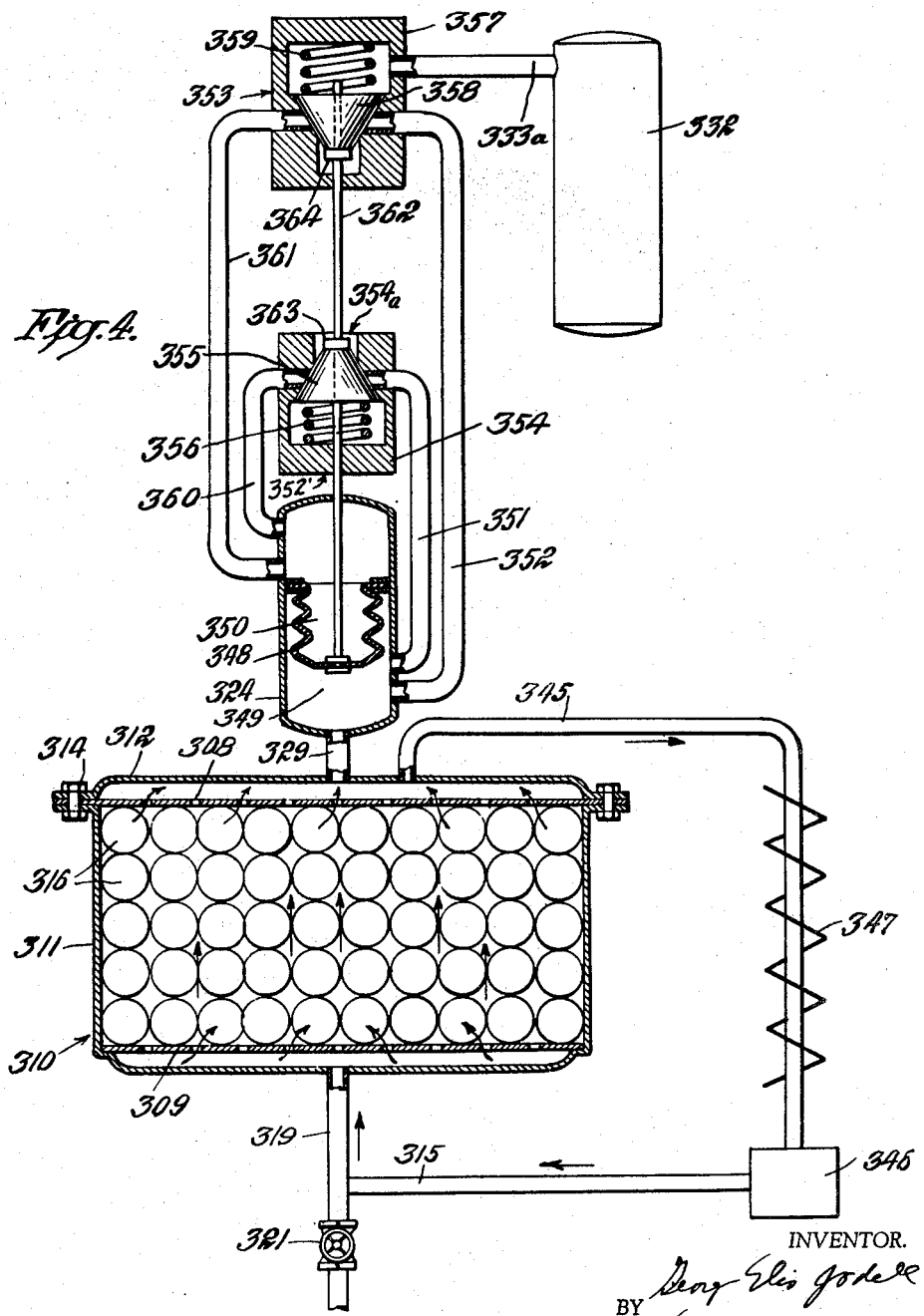

United States Patent Office 2,960,720
Patented Nov. 22, 1960

2,960,720

APPARATUS FOR FORMING FOAMED PLASTIC OBJECTS

Georg Elis Jodell, Toorak, Victoria, Australia, assignor to Aktiebolaget Electrolux, Stockholm, Sweden, a corporation of Sweden Original application Sept. 13, 1956, Ser. No. 609,681, now Patent No. 2,907,072, dated Oct. 6, 1959. Divided and this application Nov. 6, 1958, Ser. No. 777,532

Claims priority, application Sweden Sept. 26, 1955

9 Claims. (Cl. 18—1)

My invention relates to apparatus for forming objects of foamed or expanded plastic. This application is a division of my application Serial No. 609,681, filed September 13, 1956, for Method of Forming Foamed Plastic Objects, now Patent No. 2,907,072, granted October 6, 1959.

It is an object of my invention to provide an improved apparatus for molding objects from a body of expandable plastic, which includes provisions for controlling the pressure of a gaseous or liquid fluid which envelops the body of plastic whereby its size can be regulated while it is being heated to an elevated temperature, and, when the body has reached the desired temperature, for quickly reducing the external pressure to which the plastic body is subjected to bring about its expansion in all parts thereof substantially all at one time.

The above and other objects and advantages of the invention will be more fully understood from the following description taken in conjunction with the accompanying drawings forming a part of this specification, of which:

Fig. 1 is a vertical sectional view diagrammatically illustrating a mold of known type for forming objects from expandable plastic;

Figs. 2 and 4 are sectional views diagrammatically illustrating apparatus embodying the invention for molding objects from expandable plastic; and Fig. 3 is a sectional view diagrammatically illustrating an alternative arrangement for controlling the apparatus shown in Fig. 2.

In Fig. 1 is illustrated a mold 10 of known type for producing objects from expandable plastic like polystyrene, for example, which is available under the trade names "Styrofoam," "Styropar" and "Dylite." The mold 10 comprises a hollow body 11 and a cover 12 which is removably secured thereto at 14. A conduit 15 is connected to the hollow body 11 for delivering to the mold 10 a suitable gaseous heating medium such as hot air or steam, for example.

The mold 10 is charged with a given quantity of the expandable plastic which desirably is in the form of beads or granules 16 and which, depending upon the density of the object to be formed, may or may not have undergone pre-expansion. In accordance with known practice, a gaseous heating medium such as air, for example, at an elevated temperature of about 110° C. is delivered through the conduit 15 to the mold 10 to effect heating of the plastic beads or granules 16, the cover 12 and hollow body 11 being held apart in any suitable manner to form a gap 17 therebetween which serves as an outlet for the gaseous heating medium.

When beads or granules of an expandable plastic of the polystyrene type, for example, are heated by a gaseous heating medium, gases are formed in the beads or granules 16 due to a substance present in the plastic, a part of which passes outwardly therefrom and mixes with the gaseous heating medium enveloping the beds or granules. The part of the gases formed in the beads 16 which is trapped and remains in the beads tends to expand the cellular wall structure of the beads because the gap 17 readily allows the gaseous heating medium to escape from the interior of the mold 10, thus preventing the pressure of the gaseous heating medium enveloping the beads from building up within the mold.

When sufficient heating of the plastic beads or granules has been effected by the gaseous heating medium delivered to the mold 10 and the gases formed in the beads build up an internal pressure which reaches a definite value, the cellular wall structure becomes soft and pliable and can no longer withstand the internal gas pressure. When this occurs, the beads at the immediate vicinity of the connection of conduit 15 to the hollow body 11, which is the region where the gaseous heating medium enters the mold, initially expand and change their shape and fill the gaps or spaces between adjacent beads or granules, as diagrammatically indicated at 16' in Fig. 1.

The beads 16' actually fuse together to form a unitary body or layer of material through which the gaseous heating medium being delivered through conduit 15 cannot penetrate. This is objectionable because, as soon as the supply of the gaseous heating medium to the mold 10 is blocked by the expanded plastic at the vicinity conduit 15 is connected to the hollow body 11, further heating by the gaseous heating medium of the beads or granules 16 at regions removed from the conduit 15 is substantially reduced and more or less stopped. Heretofore, therefore, it has been the practice to employ a relatively large number of feed lines or conduits for delivering gaseous heating medium at a multiplicity of closely adjacent regions at several sides of an object to be molded from expandable plastic. In any case, it has been necessary to make certain that at no region of a charge of expandable plastic will the beads or granules be too far removed from a point where gaseous heating medium is delivered to the charge. This arrangement for heating a charge of expandable plastic possesses disadvantages because it limits the thickness of objects that can be formed. A further objection is that those beads or granules at the immediate vicinity at which gaseous heating medium enters a charge tend to expand before the beads further removed from the supply point begin to expand, which results in an object that is not of uniform quality throughout.

In the formation from expandable plastic of an object having a relatively low density, it is usually the practice to employ beads or granules of foamable plastic which have undergone pre-expansion. In such case, the cellular wall structure of the beads or granules may be relatively thin and the beads will tend to expand in an environment of the gaseous heating medium at a temperature insufficiently high to prevent the expanded beads from effectively sintering and fusing to one another. It will be understood that the size of the beads or granules 16 and 16' in Fig. 1 is only diagrammatically illustrated and has been magnified for the purpose of showing more clearly the action that takes place when a gaseous heating medium is introduced into the mold 10 through conduit 15 and that the beads lose their individual identity when they become fused to one another upon being expanded.

In Fig. 2 of the drawings I have shown my invention in connection with a mold 210 including a hollow body 211 having a removable cover 212 secured thereto at 214, a suitable gasket 213 being provided therebetween to form an air-tight seal. A conduit 215 having a valve 228 is connected to the hollow body 211 for delivering to the latter a suitable heating medium in liquid form. A vertically extending vessel 224 provided with a sight glass 227 is connected at its lower end by a conduit 229 to any suitable part of the mold 210, as to the cover 212, for example. A conduit 230 having a valve 231 connected therein is connected to the upper part of vessel 224.

A vessel 232, which may be referred to as a gas pressure vessel, is connected by a conduit 233 to the upper part of vessel 224, the conduit 233 being provided with a valve 234. The valve 234 is normally closed to retain in the gas pressure vessel 232 under pressure air or other suitable gas that, under the operating conditions encountered, will not condense at a pressure of about ten atmospheres, for example.

In employing the apparatus of Fig. 2 to form objects of expandable plastic of the polystyrene type, for example, beads or granules 216 of the plastic are introduced in the mold 210 and, with the valve 231 open, a heating medium in liquid form, such as boiling water, for example, is introduced into the mold through the conduit 215. A sufficient quantity of the heating medium is introduced into the mold 210 so that enough liquid will flow upwardly therefrom into the vessel 224 for the liquid surface level to be visible through the sight glass 227, after which the valves 228 and 231 are closed.

Due to heating effected by the liquid heating medium in the mold 210, gas is formed in the plastic beads or granules 216, a part of which passes through the liquid heating medium into the upper part of the vessel 224 to increase the pressure therein. The gas pressure in the upper part of the vessel 224 may be adjusted by opening the valves 231 and 234. The opening of valve 231 decreases the pressure in the vessel 224, and the opening of valve 234 increases the pressure therein by transferring thereto gas from the gas pressure vessel 232 which is at a considerably higher pressure than the pressure in vessel 224. When the gas pressure in the upper part of the vessel 224 is properly adjusted, the size of the beads 216 will remain substantially constant and the gas pressure being developed in the beads will always be counteracted by an enveloping atmosphere of the liquid heating medium which is at essentially the same pressure as that being developed in the plastic beads. Under these conditions, the volume of the beads 216 in the mold 210 will remain constant while the beads are being heated and gas is being formed therein, and the height of the liquid column above the beads, the liquid surface level 235 of which is visible through the sight glass 227, will remain constant.

If the pressure of the liquid heating medium enveloping the beads 216 in the mold 210 becomes too low because of a reduction in gas pressure in the vessel 224, the plastic beads will expand, thereby displacing liquid heating medium from the mold 110 and causing the liquid surface level to rise in the vessel 224. Conversely, if the pressure of the liquid heating medium enveloping the beads 216 becomes too high because of an increase in gas pressure in the vessel 224, the plastic beads will shrink and contract, thereby permitting liquid to flow from the vessel 224 into the mold 210 and cause the liquid surface level in the vessel 224 to fall. By properly adjusting the valves 231 and 234, however, the gas pressure in the vessel 224 can be regulated to keep the liquid surface level in the vessel substantially constant.

When the beads of polystyrene or like plastic have been heated to a sufficiently high temperature, such as to 95° to 98° C., for example, the valve 234 is fully closed and valve 228 alone or both valves 228 and 231 are fully opened. Under these conditions, the beads 216 in all parts of the mold 210 have reached physical instability and will expand and displace the liquid heating medium from the mold and will fuse together to form a homogeneous body.

While the valves 231 and 234 in Fig. 2 are manually controlled or adjusted to regulate the gas pressure in vessel 224, it is also possible to regulate the gas pressure automatically in the vessel 224. Such an alternative arrangement is illustrated in Fig. 3, in which parts similar to those shown in Fig. 3 are referred to by the same reference numerals. In Fig. 5 a vertically disposed hollow cylinder 236 is supported within the vessel 224' in any suitable manner (not shown). Within the cylinder 236 is positioned a vertically movable valve or slide member 237 which is connected by a rod 238 to a hollow float 239 which is partly immersed in the liquid body held in the vessel 224'. The valve member 237 comprises top and bottom ends 240 which fit snugly within the hollow cylinder 236 and an intermediate or central section 241 therebetween having a cross-sectional area smaller than the interior of the cylinder to form a ring-shaped passage 242 between the top and bottom ends 240.

The hollow upright cylinder 236 is formed with several openings 243 to establish communication between the chamber 242 and the gas space in the upper part of the vessel 224'. The upright cylinder 236 is formed with additional openings above and below the openings 243 in which are connected the ends of conduits 233' and 244, respectively, the opposite end of conduit 233' being connected to the gas pressure vessel 232 and the opposite end of conduit 244 being located outside the vessel 224' and communicating with the atmosphere.

When the pressure of the liquid heating medium enveloping the beads 216 in the mold 210 tends to become too low and the beads tend to expand and displace liquid from the mold, the liquid surface level in vessel 224' will rise, and the float 239 in turn will tend to move upwardly and lift valve member 237 sufficiently so that gas from the pressure vessel 232 will flow through conduit 233', ring-shaped space 242 and openings 243 into the upper part of the vessel 224'. Conversely, when the pressure of the liquid heating medium enveloping the beads 216 becomes too high and the beads tend to shrink and contract, liquid will tend to flow into the mold 210 from the vessel 224' and the liquid surface level in the latter will tend to fall, and the float in turn will tend to move downward and lower the valve member 237 sufficiently so that gas from the upper part of vessel 224' will flow through the openings 243 into the space 242 and from the latter through conduit 244 exteriorly of the vessel.

Hence, the control shown in Fig. 3 and just described functions automatically to allow gas from vessel 232 to flow through conduit 233' into the vessel 224' to increase the pressure therein, and to allow gas to be discharged exteriorly of the vessel 224' through conduit 242 to decrease the pressure in the vessel. It will be evident that in moving up and down responsive to rise and fall of the liquid surface level in the vessel 224', the valve member 237 can shift in the hollow cylinder 236 to different positions so as to effect partial or complete openings of the gas passageways formed by the conduits 233' and 244. In this way, the pressure in the vessel 224' can be automatically adjusted so that the pressure of the liquid heating medium enveloping the beads 216 will aways counteract the gas pressure developing in the beads and the size of the beads will be maintained substantially constant at all times. In other respects, the operation of the embodiment of Fig. 3 is like that of Fig. 2 and will not needlessly be repeated.

In Fig. 4 I have shown another embodiment of the invention in which the pressure of a gaseous atmosphere enveloping the beads or granules of plastic, which may be of the foamable polystyrene type, for example, is automatically controlled to maintain the size of the beads substantially constant while they are being heated. The mold 310 in Fig. 4 includes a hollow body 311 having a cover 312 removably secured thereto at 314, a gasket 313 being clamped therebetween. The mold 310 further includes apertured top and bottom plates 308 and 309 between which the expandable plastic beads or granules 316 are held, the apertured plates and mold parts adjacent thereto providing manifolds or chambers to which are connected conduits 319 and 345 which form part of a circuit through which a gaseous heating medium is circulated with the aid of a pump 346. Heating of the gaseous medium may be effected by an electrical heating element 347 in thermal exchange relation with the conduit 345. When heating of the beads or granules 316 is being effected, a valve 321 in conduit 319 is closed. Under these conditions, the gaseous medium, which is heated during its flow through conduit 345 by the heating element 347, flows from pump 346 through conduits 315 and 319 into the bottom part of the mold 310. After passing through the body of beads 316, the gaseous heating medium flows from the upper part of the mold through conduit 345 to the intake side of the pump 346. It may be desirable in the embodiment being described to evacuate the air from the circuit in which the gaseous heating fluid is circulated after the plastic beads 316 have been placed in the mold 310 and introduce into the circuit a gaseous medium similar to that formed in the plastic beads 316 during their heating.

In order to control the pressure of the gaseous medium enveloping the beads 316 while they are being heated, a vessel 324 is connected by a conduit 329 to the mold 310, as to the cover 312, for example. Within the vessel 324 is provided an expansible and contractible bellows 348 to form chambers 349 and 350. Conduits 351 and 352 are connected to the bottom part of vessel 324 and communicate with the chamber 349. When the gas pressure in mold 310 tends to become too high and the beads 316 tend to shrink, the pressure in chamber 349 also tends to increase, which causes the bellows 348 to contract. When this occurs, conduit 351, which is normally closed at its upper end by a valve 352', momentarily becomes open to permit gaseous medium to flow therethrough from chamber 349 to the atmosphere. Conversely, when the gas pressure in mold 310 tends to become too low and the beads 316 tend to expand, the pressure in chamber 349 also tends to decrease, which causes the bellows 348 to expand. When this occurs, conduit 352, which is normally closed at its upper end by a valve 353, momentarily is connected to the gas pressure vessel 332 to permit gas to flow therethrough from the latter to the chamber 349. In this manner, gas is discharged from the chamber 349 to the atmosphere or gas is transferred thereto from the gas pressure vessel 332, so that the mold 310, to which the chamber 349 is connected, will be constantly maintained at a pressure that will keep the size of the beads 316 substantially constant while they are being heated.

The valve 352' comprises a hollow casing 354 having a valve member 355 therein which is biased upwardly to its closed or seated position by a coil spring 356. The valve 353 comprises a hollow casing 357 having a valve member 358 therein which is biased downwardly to its closed or seated position by a coil spring 359. When the valve member 355 is in its closed position, it closes both the upper end of conduit 351 and the upper end of a conduit 360 which is connected at its lower end to the vessel 324 and is in communication with the chamber 350. When the valve member 358 is in its closed position, it closes both the upper end of conduit 352 and the upper end of a conduit 361 which is also connected at its lower end to the vessel 324 and is in communication with the chamber 350. To effect the transfer of gas from the gas pressure vessel 332 to the chamber 349 through conduit 352, as explained above, valve member 358 moves from its closed or seated position, which allows gas to flow from the pressure vessel 332 through conduit 333a and hollow casing 357 into the upper end of conduit 352.

Movement imparted to the bellows 348 is transmitted to the valve members 355 and 358 with the aid of a rod 362 which is secured at its lower end to the bellows, the valve members 355 and 358 being apertured to allow the rod to pass therethrough. The rod 362 is provided with fixed blocks 363 and 364 which are axially immovable thereon. When the pressure in the compartments 349 and 350 at opposite sides of the bellows 348 is substantially the same, the valve members 355 and 358 are in their closed positions and the fixed blocks 363 and 364 on the rod 362 are in abutting relation with the valve members, as shown in Fig. 4.

When the plastic beads 316 are being heated, gases are formed in the mold, as explained above. In the event the beads 316 tend to expand, the pressure of the gaseous medium in the mold 310 and in the chamber 349 will tend to increase, which will cause the bellows 348 to contract and impart upward movement to rod 362, and the latter will freely move through the valve member 355. With such upward movement of the rod 362, the fixed block 364 thereon lifts valve member 358 from its seat against the biasing action of the spring 359.

With valve member 358 moved to an open position, gas from the pressure vessel 332 can flow into the chamber 349 in a path of flow which includes conduit 333a, valve casing 357 and conduit 352, and the pressure in the chamber 349 and mold 310 in communication therewith will thus be increased. When valve member 358 moves to its open position, gas can also flow from the vessel 332 in a path of flow which includes conduit 333a, valve casing 357 and conduit 361 which is connected at its lower end to the chamber 350. When the pressures in chambers 349 and 350 are equalized, the bellows 348 will expand and impart downward movement to rod 362 until valve member 358 is moved back to its closed position by the biasing action of the spring 359.

In the event the beads 316 tend to shrink or contract, the pressure of the gaseous medium in the mold 310 and the compartment 349 will tend to decrease and the bellows 348 will expand, thereby imparting downward movement to the rod 362 which freely moves through the valve member 358 while the latter remains in its closed position. When the rod 362 moves downward, the fixed block 363 thereon lifts valve member 355 from its seat against the biasing action of the spring 356.

With valve member 355 moved to an open position, gaseous medium will flow from the chamber 349 through the conduit 351 into the valve casing 354 and be discharged into the atmosphere from the open end 354a thereof. Chamber 350 will also be in communication with the atmosphere when valve member 355 is in an open position by reason of the chamber 350 being connected to the valve casing 354 by the conduit 360. When the pressures in chambers 349 and 350 are equalized, the bellows 348 will contract and impart upward movement to rod 362 until valve member 355 is moved back to its closed position by the biasing action of the spring 356. In this way, the pressure of the gaseous medium in the mold 310 can be nicely regulated so that the pressure within the beads 316 will always be counteracted by a pressure that will maintain the size of the beads substantially constant while they are being heated to an elevated temperature.

When the plastic beads 316 have been heated to the desired elevated temperature at which expansion and fusion of the beads can be carried out, the pump 346 is stopped and the valve 321 is opened. The resulting sudden decrease in pressure of the enveloping gaseous atmosphere brings about the expansion of all of the beads at substantially the same time, and they fuse to one another uniformly to produce a homogeneous foamed plastic object.

It has been mentioned above that a substance is present in the plastic which forms a gas when foaming of the plastic is taking place. In foamable plastic of the polystyrene type the aforementioned substance may be present in the beads or granules in a solid or liquid state. It may be petroleum ether, for example, which is not soluble in the polystyrene beads or granules and has a relatively low boiling temperature.

In accord with the invention, expandable plastic beads or granules of the polystyrene type in which is present a non-soluble liquid such as petroleum ether, for example, may be maintained substantially constant in size when subjected to heating by enveloping the beads or granules in a fluid which is kept at a pressure substantially equal to that being developed in the beads as they are being heated to an elevated temperature. As the pressure of the medium enveloping the beads or granules is increased to counteract the pressure developed in the beads by the gas formed therein, the temperature at which the non-soluble liquid present in the beads will vigorously boil is increased from its normal value although some vaporization thereof will occur while the beads or granules are being heated.

When the beads or granules reach an elevated temperature and the pressure of the gaseous fluid enveloping the plastic is sharply reduced, the non-soluble liquid present in the beads immediately vaporizes and becomes effective to cause the beads or granules to foam and expand. This occurs because, when the pressure of the gaseous fluid enveloping the beads or granules is reduced, the boiling temperature of the non-soluble liquid in the beads is immediately lowered to its normal value with the result that the liquid vaporizes very rapidly and promotes the formation of gases.

When the pressure of the medium enveloping the plastic beads is being increased to maintain the size of the beads substantially constant, an expanding agent in liquid form, such as petroleum ether, will not boil at the prevailing temperature, as explained above. However, as mentioned above, some vaporization of the liquid expanding agent occurs, and the vapor that does form diffuses through the cellular wall structure of the beads or granules until the external partial vapor pressure of the expanding agent is equal to the partial vapor pressure of the expanding agent within the cellular wall structure of the beads.

When the pressure of the atmosphere enveloping the beads or granules is then quickly reduced, the beads undergo expansion, and, since the boiling temperature of the liquid expanding agent present in the beads becomes lower, intensive boiling of such liquid takes place, which promotes expansion of the cellular wall structure of the individual beads and improves the sintering of the beads to one another. In this way, it is possible to produce foamed plastic objects having a relatively low specific weight.

It is also possible to make use of an inert gas like air, nitrogen or hydrogen, for example, to promote expansion of the plastic beads when they reach an elevated temperature and the pressure of the atmosphere enveloping the beads is suddenly reduced. In the embodiment of Fig. 4, for example, the circuit for circulation of the heating medium may be evacuated and charged with a vapor of the same substance employed as the expanding agent in the beads or granules. In addition, the circuit may be charged with an inert non-condensible gas like air, nitrogen or hydrogen, for example. In such event, the inert gas will also diffuse through the cellular wall structure of the plastic beads until the partial vapor pressure of the inert gas within and outside the plastic beads is substantially the same. While the plastic beads initially will contract slightly when inert gas is present in the circuit in which the gaseous heating medium is circulated, the pressure of the gaseous medium enveloping the beads can be adjusted to bring the beads back to their original size when diffusion of the inert gas into the beads is more or less completed. This procedure for charging the circuit for the gaseous heating medium with inert gas can be effected in several steps until the partial vapor pressure of the inert gas in the cellular wall structure of the plastic beads has been built up to the desired value.

When plastic beads containing an inert gas are heated to an elevated temperature and the pressure of the gaseous heating medium enveloping the beads is suddenly reduced, expansion of the cellular wall structure of the beads is promoted not only by the expanding agent present in the beads but also by the inert and non-condensible gas in the beads which, up to the moment the external pressure is released, is confined under pressure within the beads.

Irrespective of whether an expanding agent in solid or liquid form is present in the plastic beads or granules or whether or not the gaseous atmosphere enveloping the beads contains an inert or non-condensible gas, by controlling the pressure of the medium enveloping the plastic beads or granules, the expandable plastic beads or granules are not permitted to expand until they are heated to a desired elevated temperature. Only after the beads have reached the desired elevated temperature are they permitted to expand, thus making certain that the beads or granules will first expand and subsequently sinter and fuse to one another.

In the embodiment of Fig. 2, a liquid heating medium is introduced into the mold 210 to effect heating of the expandable plastic beads or granules, while in Fig. 4 a gaseous heating medium is circulated through the mold 310. It will be understood that in the embodiment of Fig. 4 heating of the expandable plastic beads may also be effected by heating the mold 310 itself, as by immersing it in a body of heated liquid like water or glycerol, for example. When heating of the expandable plastic is effected in this manner and the control provisions shown in Fig. 4 and described above are not used, the gases developed in the plastic beads or granules will eventually cause the pressure of the gaseous atmosphere enveloping the beads to become excessively high and effect shrinking of the beads. It is also possible that the pressure of the gaseous atmosphere enveloping the beads may be less than the pressure in the beads so that there may be a tendency for the beads to expand before the aforementioned shrinking takes place. By employing the control provisions of Fig. 4, however, the size of the beads or granules 316 can be maintained substantially constant while the beads are being heated to the desired elevated temperature and their expansion will be brought about in the same manner explained above in connection with the embodiment of Fig. 4.

Modifications of the invention which has been illustrated and described will occur to those skilled in the art, and since it is desired that the invention not be limited to the particular arrangements set forth, it is intended in the claims to cover all those modifications which do not depart from the spirit and scope of the invention.

What is claimed is:

1. Apparatus for producing a foamed thermoplastic object comprising wall structure providing a chamber for holding a body of foamable thermoplastic granules, said wall structure in its entirety essentially defining the size and shape of the object to be formed from the body of thermoplastic granules adapted to be held in said chamber and substantially fill the latter, a fluid medium, means for maintaining in said chamber said fluid medium which envelops the thermoplastic granules adapted to be held therein, means for heating the thermoplastic granules to a sufficiently high temperature with the aid of the enveloping fluid medium to effect foaming of the granules, means responsive to an operating condition influenced by changes in the physical condition of the thermoplastic granules during heating thereof for regulating the pressure of the fluid medium to hold back the foaming action of the thermoplastic granules upon increase in temperature thereof, and means for reducing the pressure of the fluid medium to promote foaming of the heated thermoplastic granules.

2. Apparatus for producing a foamed thermoplastic object comprising a mold having walls providing a chamber for holding a body of foamable thermoplastic granules, said walls in their entirety essentially defining the size and shape of the object to be formed from the body of thermoplastic granules adapted to be held in said chamber and substantially fill the latter, a fluid medium, structure including said mold to provide a space for holding the fluid medium which envelops the thermoplastic granules adapted to be held in said chamber, means for heating the thermoplastic granules to a sufficiently high temperature with the aid of the enveloping fluid medium to effect foaming of the granules, said space having a portion which is in communication with and disposed exteriorly of said chamber, means responsive to an operating condition influenced by change in the physical condition of the thermoplastic granules during heating thereof for regulating the pressure of the fluid medium to hold back the foaming action of the thermoplastic granules upon increase in temperature thereof, said last-mentioned regulating means including a part operatively associated with the fluid medium in said portion of said space, and means for reducing the pressure of the fluid medium to promote foaming of the heated thermoplastic granules.

3. Apparatus as set forth in claim 2 in which said means for regulating the pressure of the fluid medium comprises a fluid system which contains a control fluid under pressure, said part having the control fluid and fluid medium in pressure transfer relation.

4. Apparatus as set forth in claim 3 in which said fluid medium is in liquid phase and the liquid surface level thereof is in the portion of said space removed from said chamber, and said means for regulating the pressure of the fluid medium comprises said fluid system which contains a gaseous control fluid under pressure, said gaseous control fluid and fluid medium in liquid phase being in gas and liquid contact in said portion of said space and said part displacing liquid therein.

5. Apparatus as set forth in claim 4 in which said means for regulating the pressure of the fluid medium in liquid phase is operable responsive to change in the liquid surface level in said portion of said space.

6. Apparatus as set forth in claim 1 in which said means for regulating the pressure of the fluid medium comprises a fluid system which contains a control fluid under pressure, said part having the control fluid and fluid medium in pressure transfer relation and out of intimate physical contact with one another.

7. Apparatus as set forth in claim 6 in which said means for regulating the pressure of the fluid medium is operable responsive to change in pressure thereof.

8. Apparatus as set forth in claim 7 in which said fluid medium is a heating fluid in vapor phase.

9. Apparatus for producing a foamed thermoplastic object comprising wall structure providing a chamber for holding a body of foamable thermoplastic granules, said wall structure in its entirety essentially defining the size and shape of the object to be formed from the body of thermoplastic granules adapted to be held in said chamber and substantially fill the latter, a fluid medium, means for maintaining in said chamber said fluid medium which envelops the thermoplastic granules adapted to be held therein, means for heating the thermoplastic granules to a sufficiently high temperature with the aid of the enveloping fluid medium to effect foaming of the granules, means for producing an operating condition resulting from change in physical condition of the granules during heating thereof, means for regulating the pressure of the fluid medium in accordance with said operating condition to hold back the foaming action of the thermoplastic granules upon increase in temperature thereof, and means for reducing the pressure of the fluid medium to promote foaming of the heated thermoplastic granules.

References Cited in the file of this patent

UNITED STATES PATENTS

| | | |
|---|---|---|
| 1,200,183 | Fraley | Oct. 3, 1916 |
| 1,648,586 | Kohm | Nov. 8, 1927 |
| 2,069,746 | Andrews | Feb. 9, 1937 |
| 2,235,906 | Skonning | Mar. 25, 1941 |
| 2,698,968 | Callahan et al. | Jan. 11, 1955 |

UNITED STATES PATENT OFFICE
CERTIFICATE OF CORRECTION

Patent No. 2,960,720  
November 22, 1960

Georg Elis Jodell

It is hereby certified that error appears in the above numbered patent requiring correction and that the said Letters Patent should read as corrected below.

Column 1, line 72, for "beds" read -- beads --; column 8, line 65, for "changes" read -- change --; column 9, line 40, for the claim reference numeral "1" read -- 2 --; column 10, line 37, list of references cited, for "Kohm" read -- Kohn --; line 39, list of references cited, for "Skonning" read -- Skoning --.

Signed and sealed this 26th day of September 1961.

(SEAL)

Attest:

ERNEST W. SWIDER  
Attesting Officer

DAVID L. LADD  
Commissioner of Patents  
USCOMM-DC